(12) United States Patent
Auray et al.

(10) Patent No.: US 7,438,327 B2
(45) Date of Patent: Oct. 21, 2008

(54) ELECTRICAL CONNECTION ASSEMBLY WITH UNITARY SEALING AND COMPRESSION RING

(75) Inventors: Delbert Auray, Southport, CT (US); Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 196 days.

(21) Appl. No.: 11/359,847

(22) Filed: Feb. 22, 2006

(65) Prior Publication Data

US 2006/0138775 A1 Jun. 29, 2006

Related U.S. Application Data

(63) Continuation of application No. 11/009,900, filed on Dec. 10, 2004, now abandoned, which is a continuation of application No. 10/639,906, filed on Aug. 13, 2003, now abandoned.

(51) Int. Cl.
*F16L 11/118* (2006.01)
*F16L 19/065* (2006.01)

(52) U.S. Cl. ............... 285/151.1; 285/149.1; 285/339; 285/389

(58) Field of Classification Search ........... 285/136.1, 285/139.1–139.3, 149.1, 151.1, 15, 383, 285/386, 339, 152.1, 382.7
See application file for complete search history.

(56) References Cited

U.S. PATENT DOCUMENTS

| | | | |
|---|---|---|---|
| 1,186,812 A | 6/1916 | McFerran |
| 1,327,106 A | 1/1920 | Leahy |
| 1,483,218 A | 2/1924 | Fahnestock |
| 1,488,175 A | 3/1924 | Strandell |
| 1,772,536 A | 8/1930 | Cox |
| 1,796,806 A | 3/1931 | Pearson |
| 1,809,583 A | 6/1931 | Church |
| 2,100,796 A | 11/1937 | Church |
| 2,139,413 A | 12/1938 | Kreidel |
| 2,160,353 A | 5/1939 | Conners |
| 2,233,214 A | 2/1941 | Lamont |
| 2,255,673 A | 9/1941 | Franklin |
| 2,503,169 A | 4/1950 | Phillips |
| 2,651,529 A | 9/1953 | Wayman |
| 2,744,769 A | 5/1956 | Roeder et al. |

(Continued)

*Primary Examiner*—James M Hewitt
(74) *Attorney, Agent, or Firm*—Fattibene and Fattibene; Paul A. Fattibene; Arthur T. Fattibene

(57) ABSTRACT

An electrical connection assembly for securing electrical metal conduit to a junction box or the like, having a connection body with an inlet end portion for receiving a conduit wherein the inlet end includes a first portion sized to snugly receive an end portion of a conduit and a second portion having an internal surface that diverges outwardly toward the opening of the inlet end portion. A unitary sealing and compression ring is fitted onto the end portion of a conduit, and is positioned thereon so that the sealing ring portion of the unitary ring is received within the inlet end portion. A fastening nut secures the conduit to the inlet portion by causing the sealing ring portion to form a water or fluid tight seal between the connector body and the associated conduit and forming a mechanically sound connection between the connector body and the conduit. The unitary sealing and compression ring formed of metal insures positive electrical grounding of the assembled connection.

2 Claims, 3 Drawing Sheets

U.S. PATENT DOCUMENTS

| | | |
|---|---|---|
| 2,761,705 A | 9/1956 | Kreidel |
| 2,833,569 A | 5/1958 | Budnick |
| 2,836,438 A | 5/1958 | Turnipseed |
| 3,275,347 A | 9/1966 | William |
| 3,393,931 A | 7/1968 | Wurzburger |
| 3,647,934 A | 3/1972 | Hurtt |
| 3,667,783 A | 6/1972 | Sotolongo |
| 3,794,362 A | 2/1974 | Mooney et al. |
| 3,801,131 A | 4/1974 | Appleton |
| 3,907,335 A | 9/1975 | Burge et al. |
| 3,972,547 A | 8/1976 | Itoya |
| 4,019,762 A | 4/1977 | Eidelberg et al. |
| 4,030,741 A | 6/1977 | Fidrych |
| 4,145,075 A | 3/1979 | Holzmann |
| 4,508,466 A | 4/1985 | Dennis |
| 4,547,623 A | 10/1985 | Van Brunt et al. |
| 4,606,562 A | 8/1986 | Saraceno |
| 4,676,533 A | 6/1987 | Gerondale |
| 4,880,387 A | 11/1989 | Stikeleather et al. |
| 4,983,784 A | 1/1991 | Whitlock |
| 5,028,078 A | 7/1991 | Schwarz et al. |
| 5,037,140 A | 8/1991 | Anderson |
| 5,068,494 A | 11/1991 | Bolante |
| 5,171,164 A | 12/1992 | O'Neil et al. |
| 5,189,258 A | 2/1993 | Pratesi |
| 5,230,536 A | 7/1993 | Rider et al. |
| 5,266,050 A | 11/1993 | O'Neil et al. |
| 5,393,109 A | 2/1995 | Gumpel |
| 5,951,327 A | 9/1999 | Marik |
| 6,043,432 A | 3/2000 | Gretz |
| 6,073,976 A | 6/2000 | Schmidt et al. |
| 6,080,933 A | 6/2000 | Gretz |
| 6,335,488 B1 | 1/2002 | Gretz |
| 6,380,483 B1 | 4/2002 | Blake |
| 6,444,907 B1 | 9/2002 | Kiely |
| 6,641,180 B2 | 11/2003 | Udhoefer |
| 6,767,032 B1 | 7/2004 | Gretz |

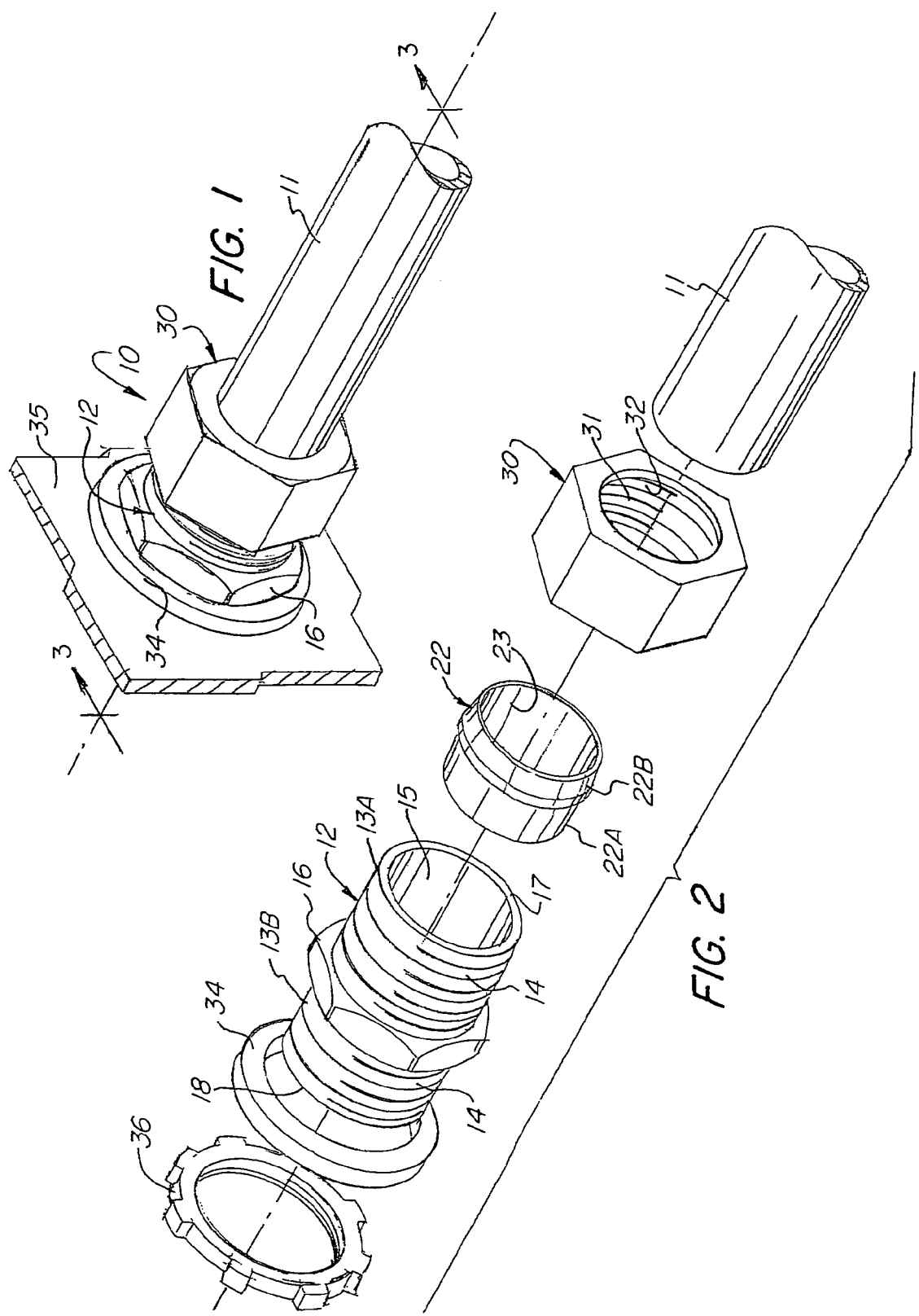

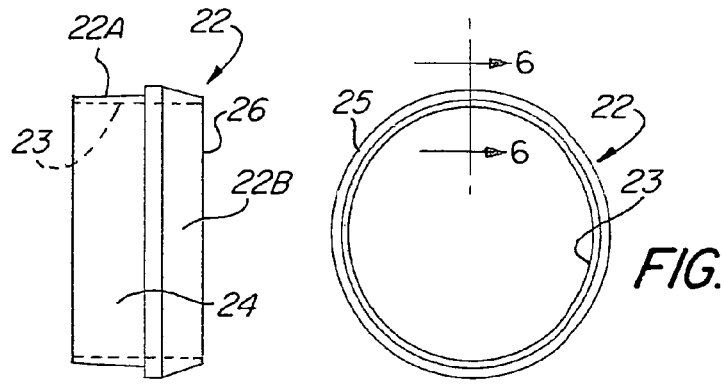
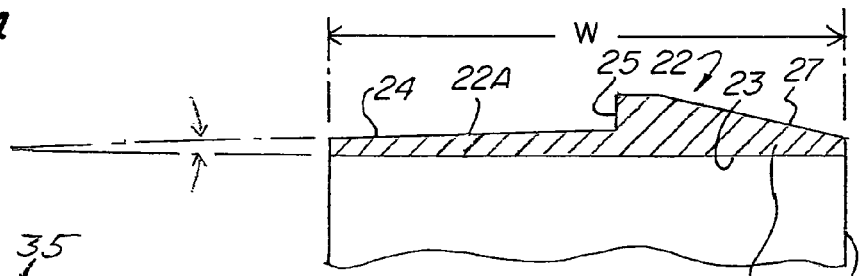
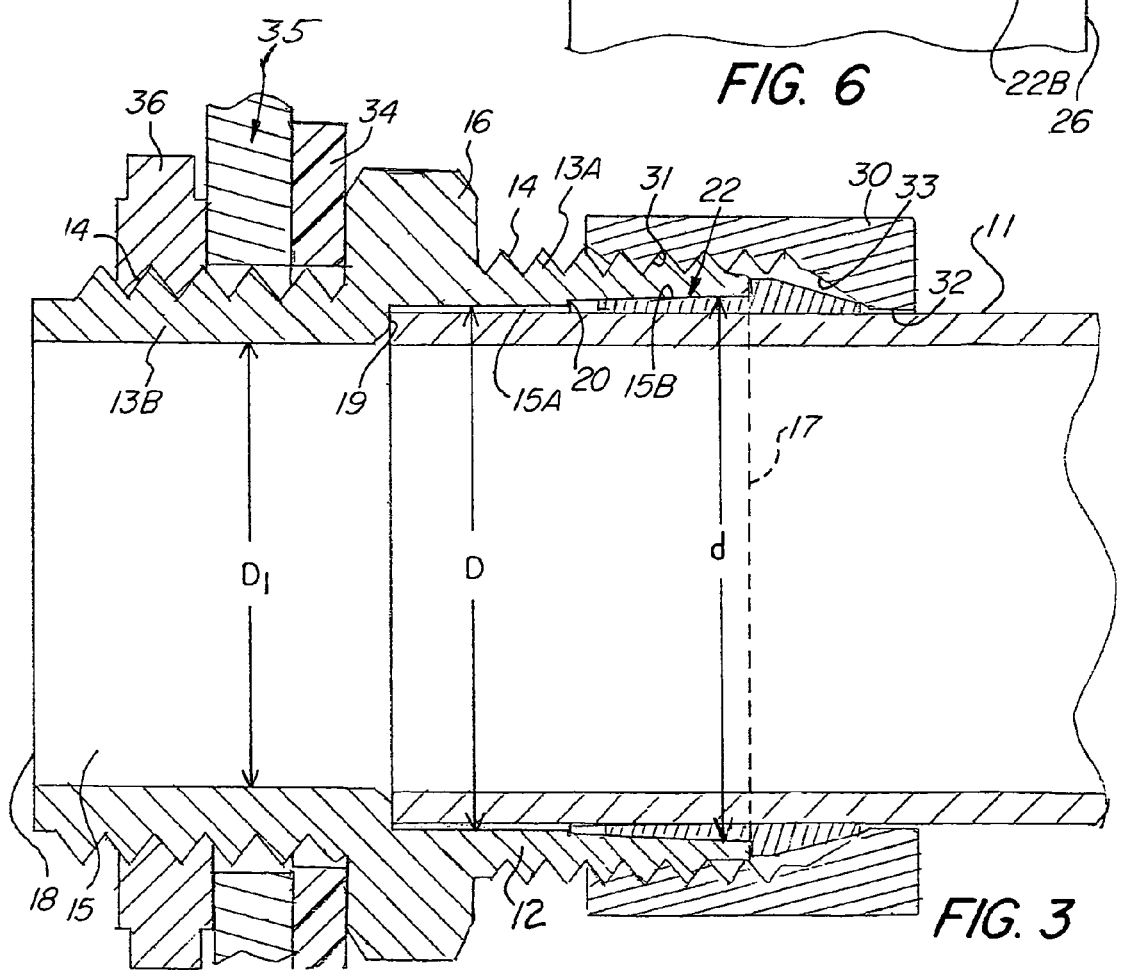

ELECTRICAL CONNECTION ASSEMBLY WITH UNITARY SEALING AND COMPRESSION RING

RELATED APPLICATION

This application is a continuation application of application Ser. No. 11/009,900 filed Dec. 10, 2004, now abandoned, which is a continuation application Ser. No. 10/639,906 tiled Aug. 13, 2003 for Electrical Connection Assembly With Unitary Sealing and Compression Ring, now abandoned.

FIELD OF THE INVENTION

This invention is directed to a connection assembly, and more specifically to a connector or coupling assembly having a unitary sealing and compression ring to effect a positively secured, sealed and electrically grounded connection.

BACKGROUND OF THE INVENTION

Heretofore it was common practice to secure an electric metal conduit that shields electrical conductors, wires or cables by inserting one end of a conduit into an externally threaded inlet end of a connecting body and securing the conduit to the threaded inlet end of the connecting body by a suitable tightening nut. The outlet end of the connecting body in turn was secured to an electrical junction box by inserting the other or outlet end of the connecting body into the knockout hole of the electrical junction box and securing the same by a locking nut or other suitable means, e.g. a snap fit retaining means as disclosed in a co-pending U.S. patent application Ser. No. 10/283,978 filed Oct. 30, 2002, which is incorporated herein by reference. It has been noted that such prior known connecting assemblies did not prohibit rain or water from seeking its way through the connection. Also, electrical grounding of conduits was not at all times positive.

SUMMARY OF THE INVENTION

An object of this invention is to provide an improved coupling or connector assembly which is capable of prohibiting water or rain from seeping through the coupling or connector assembly.

Another object is to provide an improved coupling or connector assembly capable of effecting a positive electrical grounding of a conduit connected thereto.

Another object is to provide an improved electrical coupling or connector assembly that is relatively simple to fabricate, easy to assemble and positive in operation.

Another object is to provide an electrical connection assembly having a unitary or integrally formed sealing and compression ring adapted to be snugly fitted onto an end portion of a conduit that will effectively secure, seal and electrically ground the conduit upon assembly of the connection assembly.

The foregoing objects and other features and advantages are readily obtained by a connector or coupling assembly that includes a connector or coupling body provided with an inlet end having an opening adapted to receive a conduit, and an outlet having an opening through which the electrical conductors, wires, or cables adapted to be inserted through the conduit may extend. The external surface of the inlet end is threaded to receive a connecting nut for securing the conduit to the inlet end. The connector or coupling body is provided with a through bore having a shoulder formed intermediate the length thereof to define a stop to limit the distance a conduit may be inserted thereinto. The internal surface of the inlet end of the connector or coupling body may be optionally provided with a second ridge or stop, disposed between the intermediate shoulder stop and the opening to the inlet end. The internal surface of the inlet end includes a first portion that is generally shaped and sized to snugly receive the outer surface of the conduit, and a second portion wherein the internal surface tapers or diverges outwardly toward the inlet opening.

To secure, seal and to provide a positive electric ground for the conduit, a unitary sealing and compression ring is fitted onto the end of the conduit. The sealing ring portion of the unitary sealing and compression ring is provided with a sloping or tapered outer surface that complements the taper of the outer second portion of the inlet end. The compression ring portion of the unitary sealing and compression ring is provided with an outer camming surface which is sloped in the opposite direction to that of the sealing ring portion, and to a greater degree of slope.

The arrangement is such that as the connecting nut is tightened onto the threaded inlet end of the connector body, the metallic unitary sealing ring portion is urged into a positive sealing relationship between the conduit and the second portion of the inlet end of the connector or coupling as the metallic compression ring portion is being compressed onto the conduit to insure a positive electric grounding of the conduit while imparting a secure frictional holding force sufficient to prohibit the conduit from being pulled out of the connector or coupling body.

Other features and advantages will become readily apparent in view of the following detailed description and drawings.

IN THE DRAWINGS

FIG. 1 is a perspective view of an assembled connector embodying the present invention.

FIG. 2 is an expanded perspective view illustrating the component parts of a connector embodying the invention.

FIG. 3 is a side sectional view of the connector assembly embodying the invention taken along line 3-3 on FIG. 1.

FIG. 4 is a side view of the unitary sealing and compression ring component.

FIG. 5 is an end view of FIG. 4.

FIG. 6 is a sectional view taken along line 6-6 on FIG. 5.

DETAILED DESCRIPTION OF THE PREFERRED EMBODIMENTS

Figure 7:
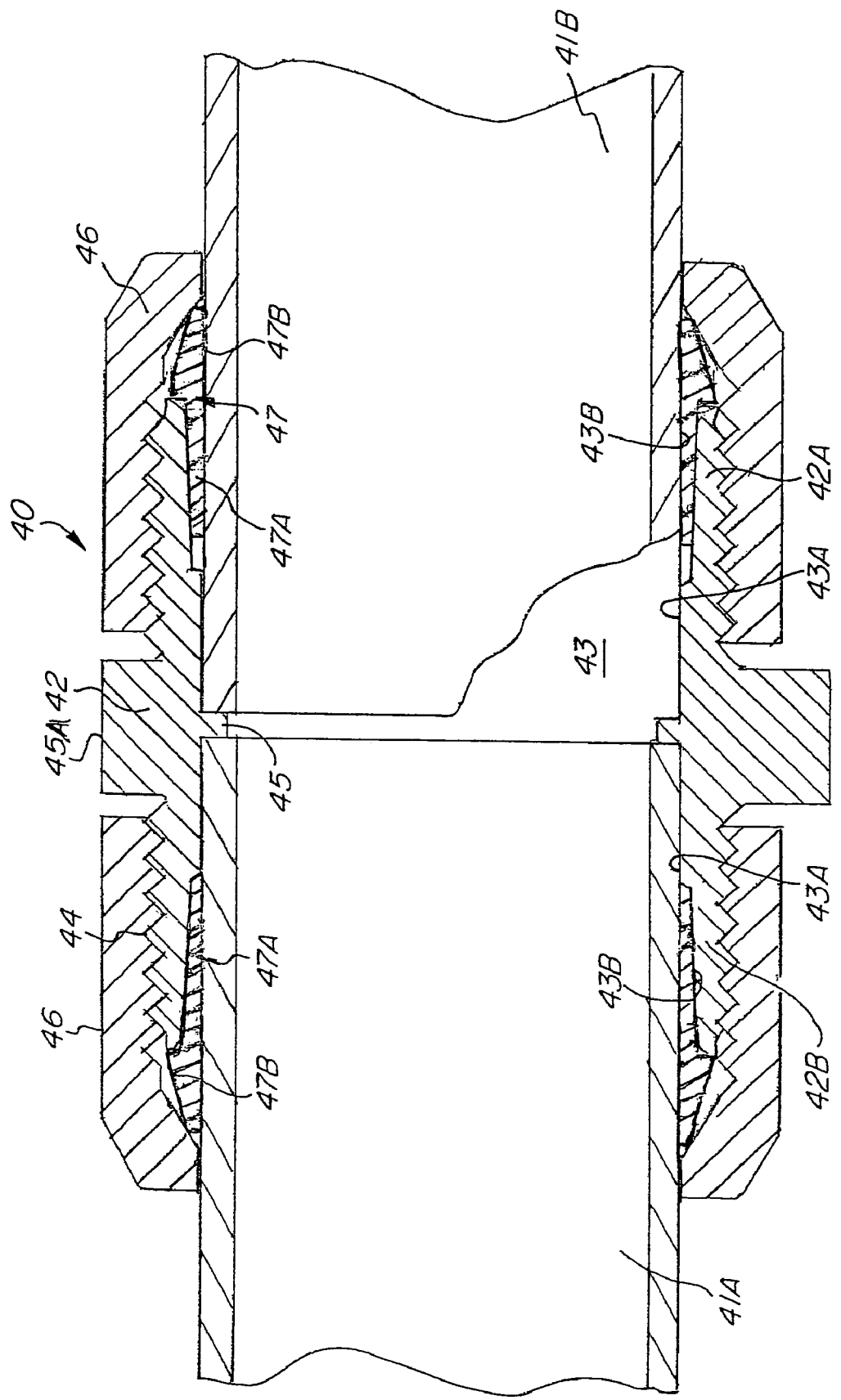
FIG. 7 is a sectional side view of a coupling assembly embodying the invention.

Referring to the drawings, there is illustrated in FIGS. 1 and 2 a connection assembly embodying the invention. A connection assembly as broadly used herein encompasses a connector assembly 10, by which an electric metallic conduit 11 is connected to an electrical junction box 35 as shown in FIG. 1, or coupling assembly 40 as shown in FIG. 7 for coupling two conduits 41A and 41B in end to end relationship.

The illustrated embodiment of the invention as depicted in FIGS. 1 to 6 is directed to a connector assembly 10 which includes a connector body 12 which is generally formed as zinc casting or other suitable metal. The connector body 12 includes an inlet end 13A and an outlet end 13B. In the illustrated embodiment of FIGS. 1 and 2, the outer surfaces of the inlet end 13A and outlet end 13B are provided with suitable external threads 14. The connector body 12 also includes a through bore 15, as will be hereinafter described in more detail. Intermediate the inlet end 13A and outlet end 13B, the connector body 12 is provided with a radially outwardly extending flange 16 having a hexagonal shape. However, it will be understood that the flange 16 may assume any suitable shape that will facilitate gripping the same for purposes of assembling.

Intermediate between the inlet opening 17 and the outlet opening 18 of the through bore 15 there is formed an internal shoulder 19 which functions as a stop to limit the distance a conduit 11 can be inserted into the inlet end 13A of the connector body 12. Generally, such conduits are formed of metal, e.g. steel and the like.

In accordance with this invention, the portion of the through bore 15 defining the distal portion or first portion 15A of the inlet end 13A, adjacent the stop shoulder 19, has a substantially uniform diameter D of a size and shape to snugly receive the end portion of the conduit 11 as shown in FIG. 3. The distal or first portion 15A of the inlet end 13A extends from the stop shoulder 19 to an intermediate point or ridge or shoulder 20 spaced inwardly of the inlet opening 17. It will be understood that the ridge 20 is optional. The internal surface at the proximate end of the inlet 13A or second portion 15B of the inlet end 13A has an internal surface that tapers outwardly so that the diameter d of proximate end or second portion 15A progressively increases from the end of the first portion 15A to the inlet opening 17. The portion of the bore 15 defining the outlet end 13B has a diameter $D_1$ which is slightly less than diameter D, as determined by the thickness of the stop shoulder 19.

In accordance with this invention, a unitary metallic sealing and compression ring 22 is snugly fitted onto an end portion of a conduit 11 as seen in FIG. 3. The unitary sealing and compression ring 22 includes a sealing ring portion 22A and a compression ring portion 22B. The internal surface 23 of the sealing and compression ring 22 is sized so as to be fitted onto the end portion of a conduit, e.g. conduit 11. The external surface 24 of the sealing ring portion 22A is formed with a slight taper that complements the internal taper of the described second portion 15B of the inlet end 13A. As best seen in FIG. 6, the taper 24 slopes in a radially outward direction. At a point intermediately of the width W of the ring 22, there is formed a radially outwardly extending shoulder 25. Between the shoulder 25 and the inlet opening 26, the outer surface 27 defines a camming surface that slopes downwardly from the shoulder 25 to the inlet opening 26. Preferably, the unitary sealing and compression ring 22 is formed of brass.

A fastening nut 30 is provided for securing the conduit 11 to the inlet end 13A of the connector body 12. The nut 30 is provided with internal threads 31 by which it can be threaded onto the external threads 14 of the inlet end 13A of the connector body 12. The nut 30 is provided with an opening 32 sized to permit the nut 30 to be fitted onto the end of the conduit 11. Circumscribing the opening 32, the nut 30 is provided with an internal cam surface 33 arranged to engage the external cam surface 27 of the combined sealing and compression ring 22 as the nut 30 is threaded onto the inlet end 13A of the connector body 12 to finally secure the conduit 11 to the connector body 12.

Completing the connector assembly 10 is a resilient washer 34 formed of a resilient plastic, rubber or the like, which is arranged to be fitted onto the outlet end 13B of the connector body 12. In operation, the washer 34 is fitted onto the outlet end 13B of the connector body 12 so as to be positioned between the flange 16 and the side wall of a junction box 35 or the like. A lock nut 36 or other suitable locking fastener is fitted onto the outlet end portion 13B of the connector to positively secure the connector body 12 to an electrical junction box 35 or the like. As the locking nut 36 is tightened onto the outlet end 13B of the connector body 12, the resilient washer 34 is compressed or wedged between the flange 16 and the side wall of the junction box 35. Accordingly, the resilient washer 34 provides a seal about the knockout opening of the junction box 35 that receives the outlet end portion 13B of the connector body 12.

In assembling the connector assembly 10, the fastening nut 30 is positioned onto the end of the conduit 11, as noted in FIG. 3. The unitary sealing and compression ring 22 is then fitted onto the end of the conduit so that the sealing ring portion 22A is received within the inlet end 13A as noted in FIG. 2. With the fastening nut 30, and sealing and compression ring 22 thus positioned onto the end of the conduit, the conduit 11 is inserted into the inlet end 13A until the end of the conduit 11 is brought into abutting relationship with stop shoulder 19. With the conduit 11 seated against the stop shoulder 19, the fastening nut 30 is tightened onto the inlet end 13A. The tightening of the fastening nut 30 onto the inlet end 13A causes the cam surface 33 of the nut to engage the compression ring portion 22B. In doing so, the sealing ring portion 22A is urged or wedged between the outer surface of the conduit 11 and the internal tapered surface 15B of the inlet portion 13A to form a fluid tight seal thereat while causing the compression ring portion 22B to be compressed tightly onto the periphery of the conduit 11 to positively secure the connection so as to preclude any separation or pull out of the conduit 11 from the connector body 13. The sealing and compression ring 22 is formed of a metal, preferably brass, so that upon tightening fastening nut 30, the compression ring portion compresses to effect a positive electrical grounding of the electric metal conduit in the assembled position.

It will be understood that the conduit 11 may be connected to the connector body 12 either before or after the connector body 12 has been attached to a juncture box 35 or the like. To secure the described connector body 12 to a juncture box 35, a resilient washer 34 is positioned on the outlet end 13B, which is then inserted through a knockout hole of a juncture box 35 and secured thereto by the lock nut 36 or by other means, e.g. a snap fit ring as disclosed in the heretofore mentioned co-pending application.

FIG. 7 illustrates a modified embodiment of the invention as applied to a coupling assembly 40 for connecting conduits 41A and 41B in end to end relationship. As shown, the coupler assembly 40 includes a coupling body 42 which may be formed of a suitable material, e.g. a zinc casting or the like. The coupling body 42 is provided with opposed inlet and outlet end portions 42A, 42B having a through bore 43. In the illustrated embodiment, the outer surfaces of the inlet and outlet portions 42A, 42B are externally threaded as indicated as 44. Between the opposed open ends of the bore, there is provided on the internal surface thereof a circumscribing rib, ridge or shoulder 45. As will be noted, the shoulder 45 defines a stop to limit the insertion of conduits 41A, 41B into the opposed end portions of the coupling body 42.

The respective opposed end portions 42A, 42B are each provided with a bore portion 43A having a substantially uniform diameter sized to snugly receive the outer diameter of the conduit to be fitted thereinto, and an internally tapered or second portion 43B similar to that hereinbefore described with respect to the connector body 13.

Externally, the coupling body 42 is provided with an external radial flange 45A having a shape that can be readily gripped to effect the turning thereof if necessary for assembly purposes. The external surfaces of the respective opposed ends of the coupling body 42 are suitably threaded for receiving a fastening nut 46 similar to the fastening nut 30 hereinbefore described.

A unitary sealing and compression ring 47 constructed as hereinbefore described, is fitted onto each end of the respective conduits 41A, 41B.

To assemble the described coupling assembly 40, each of the respective conduits is fitted with the fastening nut 46. The described unitary sealing and compression ring 47 is then fitted onto the end of the respective conduits 41A, 41B. The unitary ring 47 is positioned on the conduit so that the sealing ring portion 47A is received within the end portion of the coupler body. With the nut 46 and unitary ring 47 so positioned on the end of a conduit, the end of the conduit is inserted into one end portion of the coupling body 42 until the conduit is seated or abuts the stop shoulder 45. The fastening nut 46 is then threaded onto its respective end portion until the sealing ring portion 47A has wedged itself into sealing relationship between the inlet end of the coupling body 42 and the mating conduit. The tightening of the fastening nut 46, as hereinbefore described, causes the compression ring portion 47B to be tightly compressed onto the conduit. As the unitary ring 47 is preferably formed of brass, a positive electric grounding is also effected in the assembly of the coupler assembly 40.

From the foregoing, it will be apparent that a fluid tight and a pressure tight connection is effected between the connector or coupling body and its corresponding conduit whereby any pullout or separation of the conduit is positively prohibited, and at the same time a positive electrical grounding of the conduit and the associated connector or coupling body is achieved.

While the invention has been described with respect to several embodiments thereof, it will be understood that variations and modifications may be made without departing from the spirit or scope of the invention.

What is claimed is:

1. An electrical connection for connecting a metal conduit thereto comprising:

a connector body having an inlet end and an outlet end, a bore extending through said connector body from said inlet end to said outlet end to form opposed inlet and outlet openings, said bore extending through said inlet end having a first inner portion and a second outer portion, said first inner portion having a diameter less than the diameter of said second outer portion adjacent said inlet opening, said first inner portion having an internal surface sized and shaped to snugly receive an end portion of a conduit, and said second outer portion having an axial length forming an internal surface that tapers progressively uninterruptedly outwardly free of any irregularities toward said inlet opening, a unitary sealing and compression metallic ring adapted to be received onto an end portion of a conduit, said unitary sealing and compression metallic ring including a sealing ring portion having an external outwardly tapering, smooth surface having an axial length for extending into said second outer portion of said bore whereby said external smooth tapering surface of said sealing ring portion complements said internal taper free of any irregularities of said second outer portion, a radially outwardly extending shoulder having an outermost diameter circumscribing said metallic ring intermediate the longitudinal length of said metallic ring, a compression ring portion having a smooth inclined camming outer surface free of any irregularities that converges from the outer periphery of said outermost diameter of said shoulder toward the central longitudinal axis of said unitary metallic ring, said inclined camming outer surface sloping away from the outer periphery of said outermost diameter of said shoulder toward an inlet opening of said unitary metallic ring whereby the outer surface of said compression ring portion is smooth and threadless, and said unitary sealing and compression ring including a smooth, cylindrical, inner surface free of any irregularities, extending throughout the axial length of said metallic ring and a generally uniform diameter extending there through, and a fastening nut having a complementary cam surface arranged to engage said inclined camming outer surface of said compression ring portion, said fastening nut being adapted to be fitted onto an end portion of a conduit for securing the end portion of a metallic conduit to said inlet end, whereby said sealing ring portion is urged in sealing relationship with said second outer portion of said inlet end as said compression ring portion is compressed onto the end portion of a conduit, adapted to be received in said inlet end, as said fastening nut is threaded onto said inlet end, and wherein said unitary metallic ring is formed of brass so as to effect a positive surface to surface grounding of said metal conduit in the assembled position.

2. An electrical coupling assembly connecting electrical conduits in an end to end relationship comprising:

a coupling body having opposed end portions terminating in opposed openings sized to receive the ends of electric conduits adapted to be connected thereto, a bore extending through said coupling body and said opposed end portions, each of said end portions of said coupling body having an a distal inner smooth surface and a proximal inner smooth surface, each of said distal inner smooth surfaces having an internal peripheral surface sized and shaped to snugly receive an electrical conduit, and each of said proximal smooth inner surfaces of said end portions having an internal peripheral surface that gradually diverges radially outwardly toward its corresponding opening, a unitary sealing and compression ring forming a closed ring having an inlet opening and an outlet opening adapted to be snugly received on the end of each conduit to be connected to said coupling body, each of said sealing and compression rings including a sealing ring portion and a compression ring portion, a radially outwardly extending shoulder circumscribing said unitary ring for defining said sealing ring portion from said compression ring portion, said shoulder having an outermost diameter, said shoulder being substantially perpendicular to said sealing ring portion, said shoulder being substantially perpendicular to said sealing ring portion, said sealing ring portion having a smooth, tapering outer peripheral surface free of any irregularities that complements the respective proximal smooth inner surface of said end portions, and an inner smooth surface free of any irregularities, said compression ring portion having a circumscribing, smooth, threadless outer surface that slopes radially inwardly and away from said outermost diameter of said shoulder toward said outlet opening, said compression ring portion having an inner smooth cylindrical surface coincidental to said inner smooth surface of said sealing ring portion to define a uniform diameter extending therethrough, and a fastening nut having a nut opening sized to be fitted onto the end of an electrical conduit to be connected to said end portions and said fastening nut having a cam surface adjacent said nut opening for engaging the external sloping, threadless uninterrupted outer surface of said compression ring portion as said fastening nut is being tightened onto said inlet end portion of said coupling body for simultaneously effecting a fluid tight surface to surface seal and a secured compressive surface to surface connection, wherein said coupling body is formed of metal, an electric metal conduit connected to each of said opposed end portions, and said metal unitary sealing and compression ring effecting a positive electric surface to surface sealing and surface to surface grounding of said electrical metal conduit in the assembled position.

* * * * *